(12) United States Patent
Mlakar

(10) Patent No.: US 6,470,549 B1
(45) Date of Patent: Oct. 29, 2002

(54) PROCEDURE FOR THE CONSTRUCTION, MAKING AND REMAKING OF EXTENDED ROAD VEHICLES

(76) Inventor: Emil Mlakar, Ribnaska ulica 5, 62000 Maribor (SI)

( * ) Notice: Subject to any disclaimer, the term of this patent is extended or adjusted under 35 U.S.C. 154(b) by 0 days.

(21) Appl. No.: 08/765,489

(22) PCT Filed: Jun. 23, 1995

(86) PCT No.: PCT/SI95/00014
§ 371 (c)(1),
(2), (4) Date: Jun. 3, 1997

(87) PCT Pub. No.: WO96/01203
PCT Pub. Date: Jan. 18, 1996

(30) Foreign Application Priority Data

Jul. 6, 1994 (SI) .............................................. P-9400276

(51) Int. Cl.[7] ............................................. B21K 21/16
(52) U.S. Cl. ..................................... 29/401.1; 29/897.1
(58) Field of Search ............................. 29/401.1, 897.1; 296/204, 205

(56) References Cited

U.S. PATENT DOCUMENTS

| | | | | |
|---|---|---|---|---|
| 3,309,759 A | * | 3/1967 | Vittone | 29/155 |
| 3,730,582 A | * | 5/1973 | Lieffring | 296/28 R |
| 4,099,313 A | * | 7/1978 | Phillips | 29/416 |
| 4,106,807 A | * | 8/1978 | Sakurai | 296/28 R |
| 4,342,146 A | * | 8/1982 | Hanson | 29/416 |
| 4,353,578 A | * | 10/1982 | Knapp | 280/781 |
| 4,457,555 A | * | 7/1984 | Draper | 296/186 |
| 4,514,891 A | * | 5/1985 | Draper | 29/401.1 |
| 4,570,321 A | * | 2/1986 | Draper | 29/401.1 |
| 4,654,946 A | * | 4/1987 | Phillips | 29/401.1 |
| 4,662,052 A | * | 5/1987 | Draper | 29/401.1 |
| 4,745,986 A | * | 5/1988 | Hanenberger | 180/233 |
| 4,790,588 A | * | 12/1988 | Corson | 296/1.1 |
| 4,865,378 A | * | 9/1989 | Filtri et al. | 296/197 |
| 6,141,850 A | * | 11/2000 | Frank et al. | 29/401.1 |

* cited by examiner

*Primary Examiner*—S. Thomas Hughes
*Assistant Examiner*—Essama Omgba
(74) *Attorney, Agent, or Firm*—Merchant & Gould P.C.

(57) ABSTRACT

A procedure for the construction, making and remaking of road vehicles in accordance with the invention makes it possible to increase the width of road vehicles, in particular standard-make road vehicles. The procedure in accordance with the invention is based on an asymmetrical extension whereby all vital parts of the driver's surroundings (steering, control assemblies and the parts of the driver's position) are kept unchanged, and need not be altered or remade. In this way the design, making and remaking are facilitated and an extension of the useful space is obtained. The procedure for the construction, making and remaking of extended road vehicles in accordance with the invention consists in keeping the vital assemblies (the driving and control assemblies) and the driver's working surroundings in their original dimensions and installation, while carrying out the extension by introducing, symmetrically or asymmetrically, or by a combination of both, an insert into the longitudinally extended vehicle. Such a construction, making and remaking keeps, essentially, all the vital parts of the original road vehicle (the control and driving parts remain unchanged). The steering wheel, the driver's surroundings with the seat and the distance between the wheels or the clamping of the front wheel remains, in any case, in the same relationship as in a series-produced, non-extended vehicle, regardless of the right- or left-hand installation of the steering wheel, or of the right- or left-hand installation of the engine.

4 Claims, 3 Drawing Sheets

PROCEDURE FOR THE CONSTRUCTION, MAKING AND REMAKING OF EXTENDED ROAD VEHICLES

The invention relates to a procedure for the construction, making and remaking of extended road vehicles in order to increase the width of road vehicles, particularly standard-make road vehicles. The procedure in accordance with the invention is based on an asymmetrical extension whereby all vital parts of the driver's surroundings (the steering, control and the driver's position assemblies) are kept in their basic, unchanged arrangement, there being no need to change or remake them. In this way the construction, making and remaking are facilitated, and an enlargement of the useful space is achieved. The invention belongs generally to the IPC class B 60 or B 60 R 27/00.

The technical problem which is successfully solved by the present invention consists in a procedure for making and remaking an extended road vehicle on the basis of a standard-make vehicle with a transversely mounted and transmission gear in front and with a front drive or four-wheel drive for, preferably but not exclusively, the construction, making and remaking in the sense of extension e.g. of a combined vehicle of extended (still permissible and useful) width, in a simple way, all by keeping, as far as possible, the original geometry of the vehicle, and by adding as few remade parts and assemblies, e.g. the engine, the transmission and control gears, the driver's position and other vital parts of the vehicles, as possible. The technical problem, which has so far not been solved in a satisfactory way, is to determine such a procedure which would provide a cost-effective series production of vehicles thus made and remade.

The standard way or remaking road vehicles with the aim to obtain as much useful space as possible, or of remaking with the aim to change the basic purpose of the road vehicle itself, is based on an increase of the useful space by superstructures. Such a superstructure includes only those parts of the vehicle which are designed for the transport of freight or passengers. For example, out of a normal truck of smaller width a vehicle with greater useful width is obtained by adding a structure in the form of extended space behind the driver's seat. An extension structure of simple remake is placed onto the basic, non-extended underframe, while a more complex remake is placed onto an underframe which is extended for the purpose. The drawbacks of such remaking or completion are demonstrated above all in worsened moving characteristics and lying on the road, and also in the non-aesthetic outlook of a vehicle thus remade. When the distance between the wheels remaining the same and the cab being extended, the ergonomics of the cab changes. The dimensions and the position of the mirrors have to be redefined, the shape and size of the door have to be changed and the driver's position has to be redefined.

Although remakings which are based on symmetrical extension of the distance between the wheels of a road vehicle provide for a balanced extension and aesthetic design of a remade vehicle, they have a major drawback in that such extension requires the replacement of many standard control and driving parts of the vehicle, which puts under question the economical justification of such remakings.

As a whole, remakings of standard-make vehicles according to already known ways and procedures are very complex and their implementation requires a number of specially made parts and assemblies, so that such remakings cannot be carried out cost-effectively on a larger scale.

The procedure for the construction, making and remaking of extended road vehicles in accordance with the invention consists in keeping the vital vehicle assemblies (both driving and control) as well as the driver's working surroundings as they were originally dimensioned and installed, while carrying out an extension through symmetrical or asymmetrical (or a combination of both) addition of an inset longitudinally into the vehicle.

The procedure for the construction, making and remaking of extended road vehicles in accordance with the invention will now be described by way of example and with reference to the accompanying drawings in which.

The procedure as claimed in accordance with the invention, and according to embodiment II, will be explained below on an example of a vehicle which the driver's seat installed on the left-hand side, which however, does not exclude the invention's applicability to the vehicles with a right-hand driver's seat.

Through a procedure for the construction, making and remaking of extended road vehicles in accordance with the invention the maximum use of existing installations, driving and control assemblies, reinforcements and supports is achieved. Unchanged, in the same place and in the same relationship also remain the left-hand driver's door with the mirror, the complete left-hand lighting installation (headlight, indicator light, sidelight), the right wheel with the wheel basket and wing, the clutch, brake and accelerator pedals, the measuring instruments and controls, and the complete driver's position with the seat. The described relationships are also preserved in certain construction examples (e.g. due to symmetrical distribution of the engine's and driver's weight), where the vehicle's engine is on the left-hand side, and the driver's seat and the steering wheel on the left-handed side as per embodiment I, or vice versa as per embodiment II. Thanks to this, there is no need for complex and costly manufacture of special parts which should have the same quality as the original parts, and and no need for repositioning the driver's seat and thereby changing the driver's working surroundings.

Figure 1:
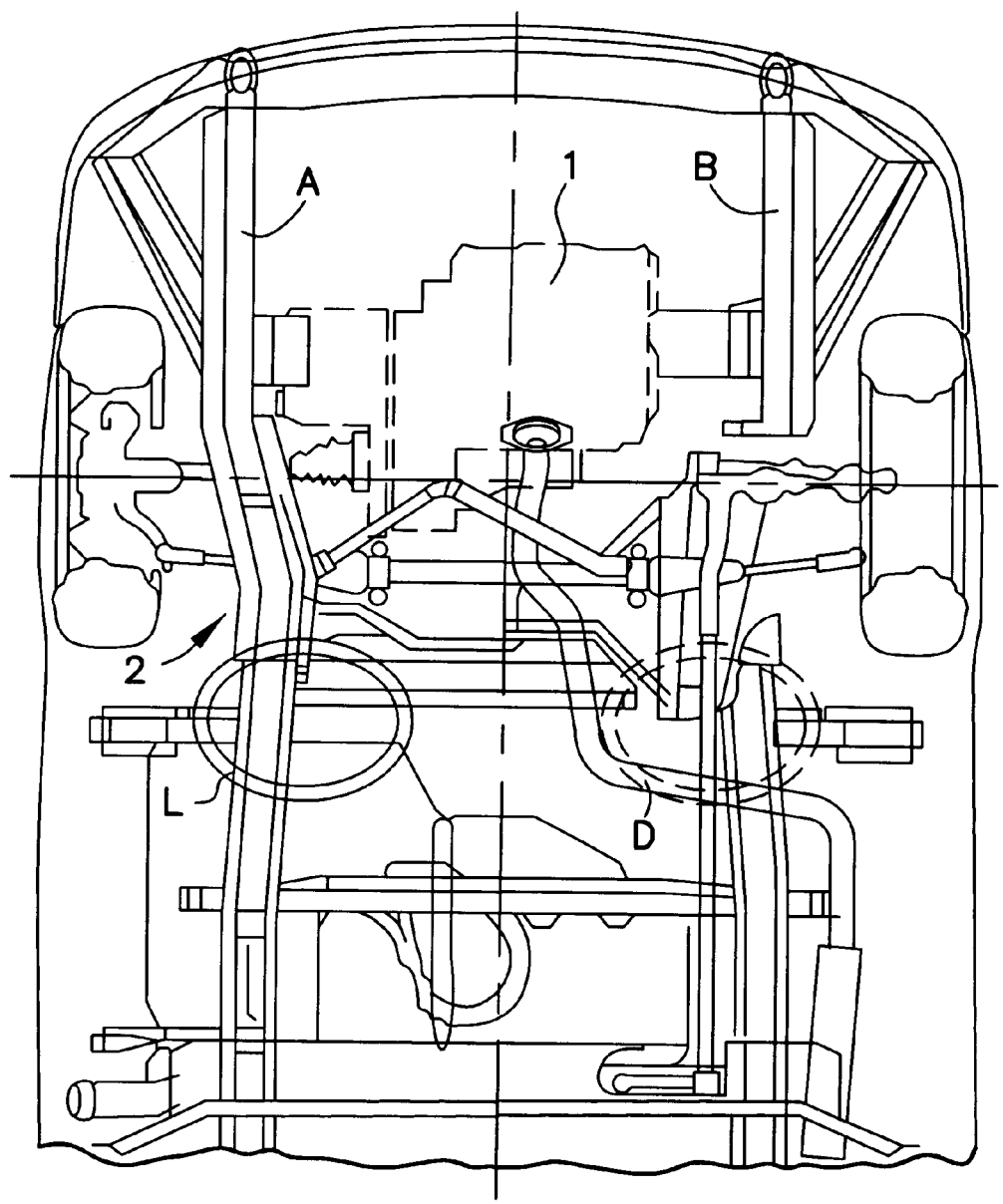
FIG. 1 is a schematic view illustrating an underframe portion with the control and driving parts of a typical road vehicle before the remake.

FIG. 1 illustrates a portion of an underframe with the control and driving mechanism of a typical road vehicle before the remake. The underframe on the drawing only serves as a basis for the explanation of the procedure in accordance with the invention, while the procedure itself is not limited to the illustrated vehicle type only. FIG. 1 illustrates the installation and position of the transversely mounted driving assembly which is clamped at the upper side between two longitudinal carriers A and B linked with the lower carrier of the engine and the front wheels suspensions. Both the A and B carrier extend into the rear part of the vehicle.

Figure 2:
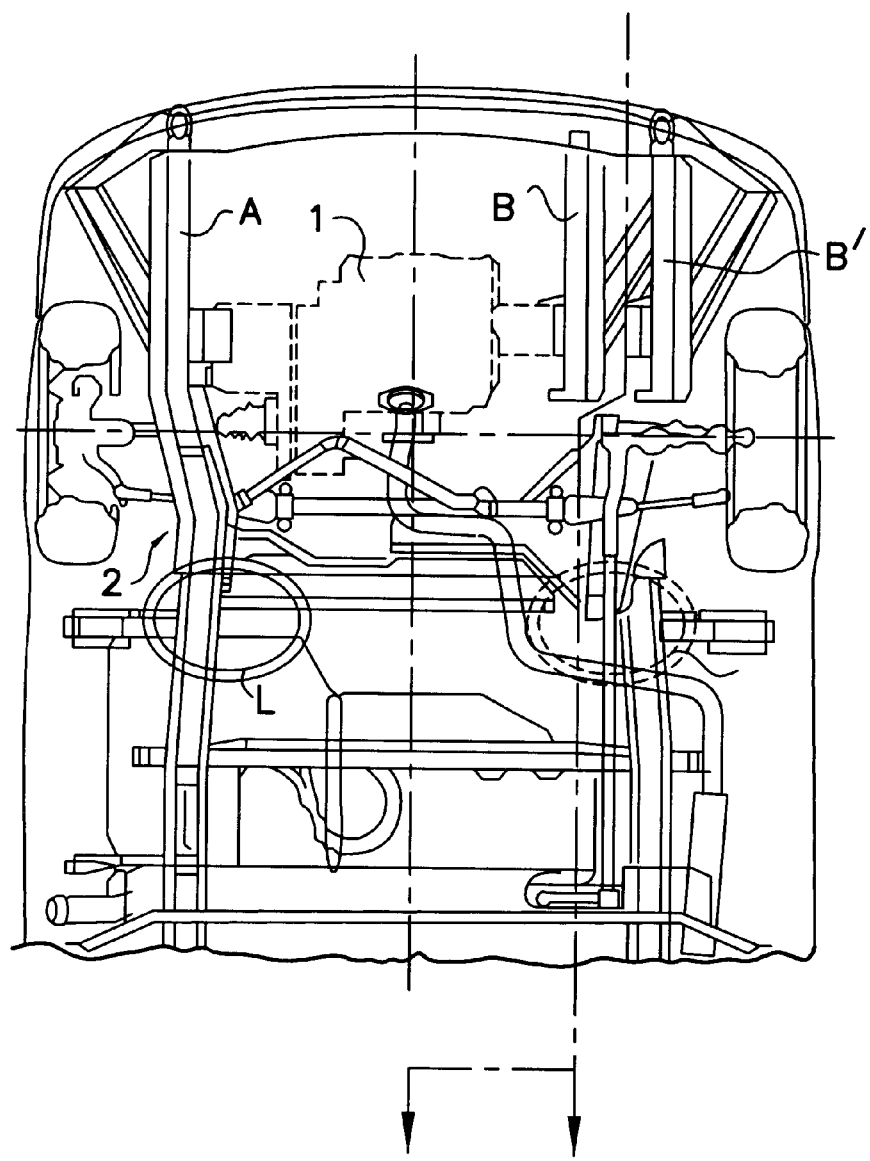
FIG. 2 is a schematic view illustrating an underframe portion with the control and driving parts of a typical road vehicle after the remake using the procedure in accordance with the invention for the extension of the vehicle according to embodiment I, and with the possibility of left- or right-hand steering-wheel installation.
Figure 3:
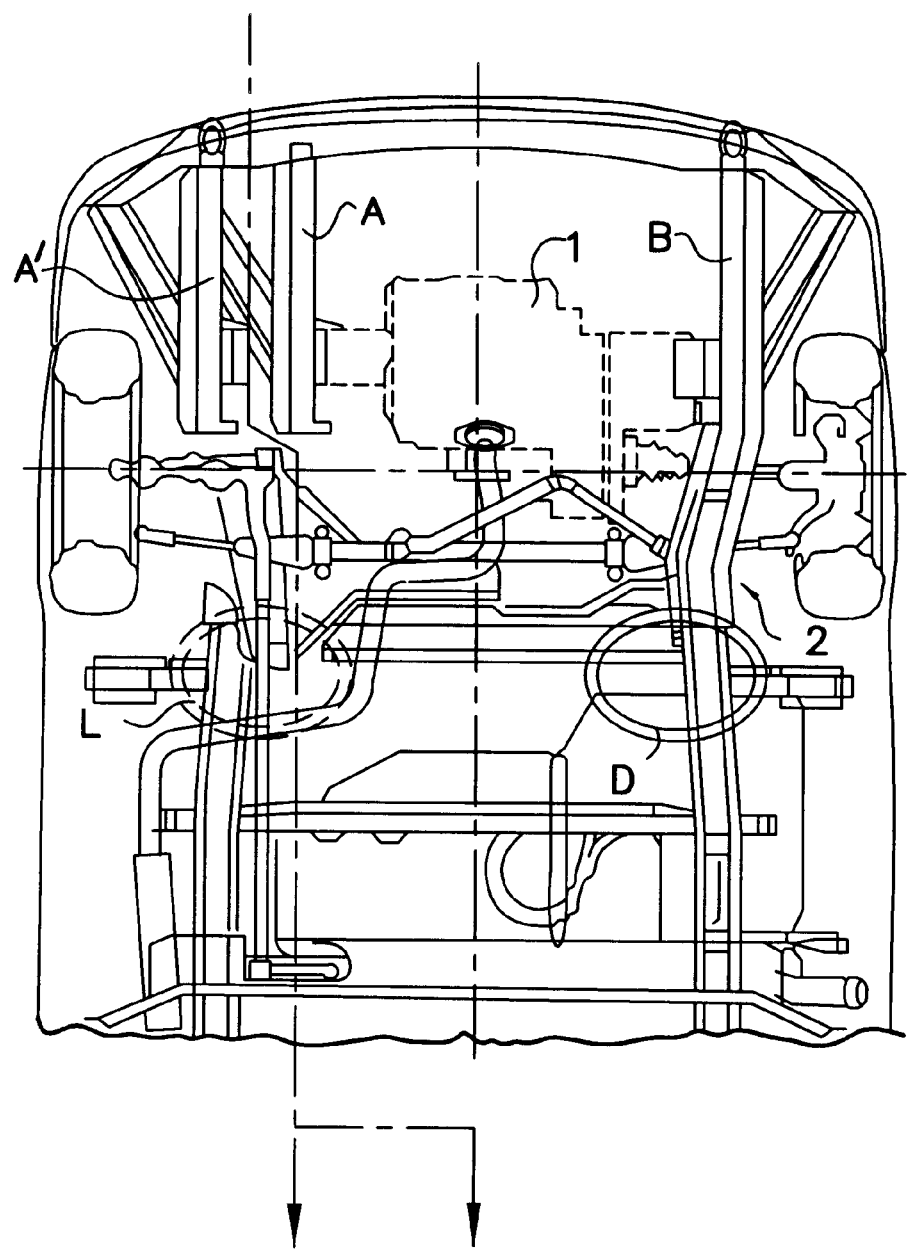
FIG. 3 is a schematic view illustrating an underframe portion with the control and driving parts of a typical road vehicle after the remake using the procedure in accordance with the invention for the extension of the vehicle according to embodiment II, and with the possibility of left- or right-hand steering-wheel installation.

By using a procedure for the construction, making and remaking of extended road vehicles in accordance with the invention, the front portion of the vehicle as illustrated in FIG. 1 is extended in such a way that the outlook of the front portion of the vehicle as illustrated in FIGS. 2 and 3 is achieved. In both cases the steering wheel can be in the left L or right R position.

According to embodiment I, the vehicle is extended behind the place where the driving assembly 1 is clamped into the carrier B, so that the clamping of the transversely mounted driving assembly into the carrier B remains unchanged. Such symmetrical extension of the front portion makes it possible to keep unchanged, besides the driving assembly 1 and its clamping into the carrier B, also the control part 2, the left-hand driver's door with the mirror, the complete left-hand half of the lighting installation (headlight, indicator light, sidelight), the left wheel with the wheel basket and wing, the accelerator, brake and clutch pedals, the measuring instruments and controls, as well as the complete driver's position with the seat. Asymmetrical extension is continued until the rearward area beyond the driving-control portion of the vehicle is reached. Further extension behind the cab or the driver's seat can be symmetrical, because the parts on both sides of the vehicle are identical. An additional carrier B' is then inserted in the area of asymmetrical extension having the same characteristics and form as the standard carrier and being identical to the carrier B. The carrier B as well as all the elements related to it also remain the same in the extended version. The position and fixation of the carrier B to the other parts and assemblies remains the same as in the basic version of the vehicle.

FIG. 3 illustrate an underframe portion with the control and driving parts of a typical road vehicle after the remake using a procedure in accordance with the invention for the extension of a vehicle according to embodiment II. This foresees the extension of another side of the vehicle. It is extended behind the place where the transversely mounted driving assembly 1 is clamped into the carrier A, so that the clamping of the driving assembly 1 into the carrier A remains unchanged. An additional carrier A' is then inserted in the area of asymmetrical extension having the same characteristics and form as the standard carrier, and being identical with the carrier A. All other characteristics of the remake remain the same as in embodiment I.

As it is illustrated in FIGS. 2 and 3, such symmetrical extensions require not only a simple insertion of the missing outer sheet and an extension of the inner parts of the centre console, but also an extension of some of the vital and carrying parts, such as the steering column—which does not present a major problem, one floating axle—which is carried out in the claimed procedure by introducing an additional part of the floating axle, which is movable and rotatable and additionally fixed to the underframe.

In the described way, an extension of a vehicle has been achieved without having to make any essential changes to the transversely mounted driving assembly or to the control mechanism; besides, such extension does not bring about any changes in the working surroundings of the cab, which although wider, remains functionally and ergonomically the same.

The procedure for the construction, making and remaking of extended road vehicles in accordance with the invention provides, through a combination of asymmetrical and symmetrical extension of a road vehicle, and efficient and technically acceptable solution which can also be applied with success in series production and remake of road vehicles. In this way, it is possible to manufacture new types of extended vehicles. In economically acceptable small series by using vehicle parts made in large series, which is economically much more acceptable than to design and manufacture extended vehicle types according to known procedures.

What is claimed is:

1. A method for increasing the width of useful space of a front drive or four wheel drive extended road vehicle having a central longitudinal axis and a driving assembly that is mounted in a front portion of the vehicle transverse to the central longitudinal axis, comprising the steps:

a. retaining the transversely mounted driving assembly clamped to and between first and second carriers that extend longitudinally generally parallel to the longitudinal axis;

b. asymmetrically extending the width of the front portion of the vehicle adjacent to the first or second longitudinal carrier to a rearward area beyond a driving control portion of the vehicle; and c. inserting an additional carrier in an area of the asymmetrical extension adjacent to the first or second carrier, said additional carrier having a length that is substantially equal to the length of the first or second carrier adjacent which it is positioned, and said additional carrier extends longitudinally generally parallel to the longitudinal axis, and wherein the clamping of the drive assembly to the first and the second longitudinal carriers remains unchanged.

2. The method of claim 1 wherein the driving control portion of the vehicle remains unchanged.

3. The method of claim 1 wherein the additional carrier is adjacent the first carrier, and the additional carrier and the first are positioned to the right of the central longitudinal axis.

4. The method of claim 1 wherein the additional carrier is adjacent the second carrier, and the additional carrier and the second carrier are positioned to the left of the central longitudinal axis.

* * * * *